US012269336B2

(12) United States Patent
Orchard (10) Patent No.: US 12,269,336 B2
(45) Date of Patent: Apr. 8, 2025

(54) FUEL LINE SAFETY PROTECTION SYSTEM (71) Applicant: Zero Emissions Aerospace Limited, Bristol (GB)

(72) Inventor: Matthew Noel Orchard, Bristol (GB)

(73) Assignee: Zero Emissions Aerospace Limited, Bristol (GB)

( * ) Notice: Subject to any disclaimer, the term of this patent is extended or adjusted under 35 U.S.C. 154(b) by 0 days.

(21) Appl. No.: 18/123,472

(22) Filed: Mar. 20, 2023

(65) Prior Publication Data
US 2023/0294510 A1  Sep. 21, 2023

(30) Foreign Application Priority Data
Mar. 21, 2022 (EP) .................................. 22163320

(51) Int. Cl.
*F16L 11/20* (2006.01)
*B60K 15/01* (2006.01)
*F16L 3/10* (2006.01)
*F16L 7/00* (2006.01)
*F16L 9/18* (2006.01)
B64D 37/30 (2006.01)
B64D 37/32 (2006.01)

(52) U.S. Cl.
CPC .......... *B60K 15/013* (2013.01); *F16L 3/1091* (2013.01); *F16L 7/00* (2013.01); *F16L 9/18* (2013.01); *F16L 11/20* (2013.01); *B64D 37/30* (2013.01); *B64D 37/32* (2013.01)

(58) Field of Classification Search
CPC ... F02C 7/222; B60K 15/01; B60K 2015/016; B60K 15/013; B64D 37/30; B64D 37/32; F16L 3/1091; F16L 11/20
See application file for complete search history.

(56) References Cited

U.S. PATENT DOCUMENTS 3,369,826 A   2/1968  Boosey et al.
3,721,898 A   3/1973  Dragoumis et al.
(Continued)

FOREIGN PATENT DOCUMENTS

EP  1794486 B1  4/2011
EP  2530294 B1  4/2014
(Continued)

OTHER PUBLICATIONS

Jason Chua et al., Systems and Methods for Storing, Transporting, and Using Hydrogen, U.S. Appl. No. 63/023,713, filed May 12, 2020.
(Continued)

*Primary Examiner* — Gerald L Sung
(74) *Attorney, Agent, or Firm* — Smartpat PLC (57) ABSTRACT

A second layer of physical protection against failure for a fuel line of a vehicle for use with high pressure and cryogenic fuels increases safety. The primary fuel line can be assembled from one or more components. The secondary protection is a single outer sleeve that includes a selectively permeable or impermeable membrane and may be reinforced. The sleeve and enclosed volume can also be used to protect against oxygen liquification in cryogenic applications. A means to detect failure of the primary fuel line and optional means to vent leaking fuel depend on the application. Clamp designs may be used to mount and clamp such assemblies in a vehicle structure.

22 Claims, 10 Drawing Sheets (56) References Cited

U.S. PATENT DOCUMENTS

| | | | |
|---|---|---|---|
| 4,149,568 | A | 4/1979 | Kuntz et al. |
| 5,527,130 | A | 6/1996 | Webb |
| 6,032,699 | A | 3/2000 | Cochran et al. |
| 7,004,510 | B2 | 2/2006 | Treichel |
| 8,172,272 | B2 | 5/2012 | Petit et al. |
| 8,997,715 | B2 | 4/2015 | Worthington et al. |
| 9,009,972 | B2 | 4/2015 | Stalcup et al. |
| 9,933,093 | B2 | 4/2018 | Corrêa et al. |
| 9,939,087 | B2 | 4/2018 | Kolarski et al. |
| 10,006,568 | B2 | 6/2018 | Callaghan et al. |
| 2002/0089177 | A1 | 7/2002 | Bonn |
| 2003/0106325 | A1 | 6/2003 | Robbie |
| 2008/0314469 | A1 | 12/2008 | Buschhoff |
| 2012/0012221 | A1 | 1/2012 | Queau et al. |
| 2012/0248251 | A1* | 10/2012 | Tichborne ............ F16L 55/1022 137/538 |
| 2014/0026597 | A1* | 1/2014 | Epstein ................. F17C 13/005 62/53.2 |
| 2014/0150649 | A1 | 6/2014 | Stolte et al. |
| 2018/0058404 | A1* | 3/2018 | Tibbs ................... F02M 61/167 |
| 2023/0102097 | A1* | 3/2023 | Soulie ...................... F16J 15/48 285/123.15 |

FOREIGN PATENT DOCUMENTS

| | | |
|---|---|---|
| KR | 101741491 B1 | 5/2017 |
| WO | 0163169 A1 | 8/2001 |
| WO | 2013064200 A1 | 5/2013 |

OTHER PUBLICATIONS

Jason Chua et al., Systems and Methods for Storing, Transporting, and Using Hydrogen, U.S. Appl. No. 63/070,153, filed Aug. 25, 2020.

John-Paul Clarke et al., Storage Module, U.S. Appl. No. 63/038,480, filed Jun. 12, 2020.

* cited by examiner

FUEL LINE SAFETY PROTECTION SYSTEM

CROSS-REFERENCE TO RELATED APPLICATION

This application claims the benefit of European Application No. 22163320, filed 21 Mar. 2022, the contents of which are incorporated by reference.

TECHNICAL FIELD

This invention relates to a protected fuel line for pressurised liquid or gaseous fuels in an aircraft or other vehicle, particularly for use with novel fuels like hydrogen.

BACKGROUND

The move away from traditional hydro-carbon fuels in aviation and other vehicle applications may require new cryogenic and high-pressure fuel systems, using both new fuel types and high-pressure levels that increase safety risks such as flammability and detonation. Achieving an equivalent level of safety to existing kerosene or gasoline fuelled vehicles requires new solutions, particularly to contain and detect any leakage from the fuel lines or pipes in the vehicle so that such a failure will not create an unsafe condition. For cryogenic fuels there is the additional hazard of the liquefaction of gases like oxygen from the surrounding air onto fuel pipes that can create a flammable mix which should be avoided.

It is expected that two levels of protection against a single fuel system failure endangering the vehicle/aircraft and a means to detect a failure condition will be needed for many vehicle applications. However, the assembly of structural elements and system components in vehicles like aircraft can make it difficult to physically position and install a second level of leak containment, and fuel pipework is traditionally installed in multiple individual lengths and connected after installation to enable access. This creates a multiplication of joints that not only makes it difficult to create a second layer of protection but can cause the second layer protection design to be very heavy and complex due to the number of joints. The number of joints can also make it difficult to detect and isolate failures. The present invention builds on past aviation and fuel supply industry knowledge to produce a superior fuel line protection system addressing all these issues for use with new aircraft and vehicle designs using alternative fuels such as hydrogen.

SUMMARY

In general terms, the invention provides a protected fuel line including a primary line for transmitting fuel, a sealed volume, and a protective sleeve providing a second layer of containment for fuel transmitted by the primary line. The invention is considered to be particularly suitable for vehicles using high pressure or novel fuels such as hydrogen. In some embodiments the protective sleeve comprises a reinforced protective sleeve. The protected fuel line may also comprise insulation within the sealed volume. Moreover, the protected fuel line may comprise a means of leak detection.

In a first aspect, the invention provides a protected fuel line comprising: a primary fuel conduit for delivery of a fuel to a propulsion system; and an outer sleeve comprising a flexible membrane encircling the primary fuel conduit to define a sealed volume therebetween, wherein the sealed volume is configured to restrain fuel leaking from the primary fuel conduit.

In some embodiments the primary fuel conduit is for delivery of a cryogenic fuel to a propulsion system.

The protected fuel line may be for use in any vehicle with a fuel system requiring a supply of a potentially dangerous high-pressure gas or liquids. For example, aircraft, marine vehicles, land vehicles, or space vehicles. That is, the invention is particularly suitable for applications in which the fuel delivered by the primary fuel conduit is a cryogenic fuel, and/or has a pressure above the environmental pressure, for example a pressure more than 10-20 percent above atmospheric pressure at sea level (1.2 bar) or more. Suitable fuels include hydrogen, methane, LPG, CNG. The invention is considered to be particularly applicable to applications where weight and safety are important design factors and applications using cryogenic fuels.

The terms cryogenic fluids and cryogenic fuels used herein have their typical meaning as used in the art. Cryogenic fluids or fuels typically have a boiling point of below 120 Kelvin. Cryogenic fuels include liquified gases such as liquid hydrogen.

The primary fuel conduit (or primary fuel line) may comprise a plurality of interconnected rigid or semi-rigid fuel pipes and connecting elements that creates the fuel flow path for the fuel on the vehicle from the storage vessel to its consumption point in the propulsion system. The integrity of this primary line forms a first level of protection against leaks and other failures. This is then protected by a secondary flexible outer sleeve that fits around the primary fuel line in usually a roughly concentric manner. This outer sleeve comprises a flexible membrane to contain or retain the fuel, such as hydrogen gas. In some embodiments the flexible membrane may be selectively permeable or impermeable such that the membrane is substantially impermeable to the fuel, but may be permeable to other liquids or gases.

The primary fuel conduit and the outer sleeve may have any shape appropriate to their function, even if in most applications a generally circular cross-section will be used.

A significant advantage of the innovation is due to the flexible nature of the outer sleeve is the ability to install a single outer sleeve across multiple interconnected primary pipes forming the primary fuel conduit, and through multiple penetrations of the vehicle structure. Installation of the outer sleeve will occur after the primary fuel conduit is assembled within the vehicle structure. The primary pipes will typically be rigid and impermeable, by using materials like stainless steel, but other materials like high-density plastics are also possible. Semi-rigid and flexible elements such as bellows may also be used for the primary fuel line to ease the primary line installation and to achieve other requirements like vibration isolation. The connections used in the primary line to connect the constituent pipes and other elements may be of various types, such as swaging or mechanical connections like threaded unions or bolted flanges. The largest connection or feature on the assembled primary line will define the minimum diameter of the outer sleeve so that it can be slid along the primary pipe for installation.

This capability of the outer sleeve to enclose multiple sections of the primary fuel conduit is significantly beneficial for weight reduction and to increase the robustness of the design, as it reduces the need to split the outer sleeve and minimises the number of heavy joints required to join the outer sleeve. This ability to slide the outer sleeve over an assembly of pipes also beneficially makes it possible to repair individual failures in the primary line without having to dispose of the whole assembly as in some traditional double wall pipe designs.

In preferred embodiments the outer sleeve comprises one or more reinforcement members, the reinforcement members optionally comprising woven or coiled reinforcement elements encircling the flexible membrane.

Thus, the outer sleeve may be lightly reinforced with a coil or a weave of strong fibres or monolithic material to contain any failure pressures and avoid excessive sleeve inflation after failure. This reinforcing weave can be any beneficial weave, such as plain or twill, and may be a closed or an open weave. Different materials for the weave are possible, including CFRP, metal or glass fibres. If a non-conductive material is used for the weave, metallic wires can be included to ensure electrical bonding. This reinforced sleeve will contain any build-up of gaseous fuel (or liquid) inside it due to a failure of the primary line. For certain applications the sleeve may also be designed with a specific burst or venting location to vent any leaked fuel safely away from the aircraft or vehicle.

In the innovation the primary fuel conduit will carry the normal operational loads of the fuel transported, including pressure and thermal loads, as well as any induced loads from the vehicle. The outer sleeve will in normal operation only react loads associated with any gas that has been injected into the sealed volume between the primary fuel line and outer sleeve. Due to the flexible nature of the sleeve and the weave of its reinforcing, this will avoid any significant transition of vehicle loads being transmitted by the outer sleeve between clamping points. In the failure case where high-pressure fuel leaks into the sealed volume the sleeve and any external clamping elements will additionally react any loads induced by this fuel entering the volume.

In some embodiments the sealed volume comprises an insulating gas at a pressure above an environmental pressure, optionally an inert gas.

This arrangement provides additional insulation for cryogenic fuel applications. Whilst the secondary impermeable outer sleeve will create additional insulation of the primary pipe, if cryogenic fuel is passing through the primary fuel line, then the presence of the outer sleeve by itself may be insufficient to avoid the outer surface of the sleeve to fall below the liquification point of critical gases like oxygen in the surrounding air, creating a safety risk. The outer sleeve however in most embodiments will be sized bigger than the outer diameter of the primary line creating a sealed volume between the primary fuel line and the outer sleeve, which can be optionally achieved by the use of spacers mounted to the primary pipe and light inflation of the outer sleeve after assembly with a thermally insulating gas. The inflation level (pressure) would be less than that required to trigger any frangible trip wire integrated on the sleeve. This sealed volume will increase the insulation of the fuel conduit increasing the temperature of the outside of the outer sleeve above the critical liquefaction temperature. This inflation may optionally be with an inert gas to provide an additional degree of safety.

The invention also provides a failure protection system as some leaks can become dangerous undetected failures for applications such as aircraft. Thus, a failure of the primary fuel line causing leakage into the sealed volume should be detectable to enable timely maintenance actions to restore both levels of protection as soon as a failure occurs. The protection system enables such detection either by the use of a direct pressure sensor installed inside the sealed volume created by the sleeve, the activation of a frangible portion of the outer sleeve (burst vent), or a frangible trip wire surrounding the sleeve and triggered by expansion of the sleeve after a failure.

Thus, the outer sleeve may comprise a frangible portion configured to burst when a pressure within the sealed volume exceeds a threshold pressure, and optionally wherein the frangible portion is in fluid communication with a venting conduit arranged to deliver fuel from the frangible portion to a safe location.

Similarly, the failure detection system may include a pressure sensor configured to detect changes in pressure in the sealed volume.

In addition, or alternatively, the failure detection system may include a frangible wire encircling the outer sleeve, the frangible wire being configured to break if the outer sleeve expands to or beyond a given threshold, and a detection system for detecting a break of the frangible wire. In some embodiments the failure detection system may include a plurality of frangible wires, each associated with a sealed sub-volume of the sealed volume, wherein detection of a break of a specific one of the frangible wires indicates a failure associated with the respective sealed sub-volume.

Preferred embodiments comprise a clamp for securing the outer sleeve to a structural member having an opening through which the outer sleeve passes, the clamp comprising an inner clamping member and an outer clamping member, the inner clamping member having an inner bearing surface adjacent the outer sleeve, the outer clamping member having an outer bearing surface configured to be installed within the opening of the structural member, and the inner and outer clamping members each comprising one of a pair of cooperating ramped mating surfaces, wherein relative movement of the ramped mating surfaces urges the inner bearing surface away from the outer bearing surface to thereby apply a clamping force to the outer sleeve.

In particularly preferred arrangements the pair of cooperating ramped mating surfaces each comprise an eccentric mating surface defined by a curved plane with a radial axis that is offset from an axis of the primary fuel conduit or outer sleeve. In this way, relative rotation of the inner and outer clamping members creates the clamping force.

The ability to install the outer sleeve after the primary line is assembled through restricting structural features on the vehicle is particularly enabled through the use of this novel clamp. Restricting features could be closed panels, bulkheads, or other structural members of the vehicle. The clamp would typically be fitted over a position where an internal spacer is positioned between the primary fuel line and the outer sleeve, unless the configuration was of tight fit without the sealed volume and not necessitating the introduction of the spacer.

The clamp is made of two elements (inner and outer clamping members), preferably made of a rigid material, but with a degree of flexibility to allow the installation and function of the clamp, such as a medium or medium-high density plastic. The inner clamping member may be designed with its inner bearing surface to fit over the outer sleeve with a minimum clearance and may have as one part of its outer surface forming the inner part of an eccentric mating surface, whilst the other part of its external surface may form part of the mounting feature to one side of the structure it is to be clamped to. The outer clamping member may have as its internal surface the matching outer part of the eccentric mating surface, with another part of the clamp's external surface being the outer bearing surface with a circular shape to match the vehicle structural penetration that the fuel line transitions through. The other part of the outer clamping member's external surface may be the mounting feature to mount to the opposite side of the structure to that of the inner clamping member. Both inner and outer clamping members may have a split and enough flexibility so they can be opened up and placed over the outer sleeve, or a means to install them in two or more parts. Without an opening force applied the inner clamping member will preferably have the minimum clearance to be placed over the outer sleeve with the sleeve installed, and slid into the structural penetration. The outer clamping member may be opened and placed over the sleeve from the other side of the structural penetration, and then pushed into the penetration and over the inner clamping member, with the eccentric mating surfaces of both elements of the clamp mating. The outer clamping member can then be rotated to create a set clamping force through the eccentric surfaces to lock the sleeve and primary line assembly to the mounting point. This clamping level can be set by a defined rotation or by a load level, and then the inner and outer clamping members locked in the clamped position by an integral locking feature or fastener. The clamp may also be locked to the structure, normally by a fastener pattern, which may in some variations of the embodiment be used to lock the clamp to stop it loosening. Alternate embodiments of the clamp design may split the clamp assembly into more than the two parts described.

Alternate configurations of the clamp are envisioned for mounting the fuel line assembly to structure that may not require a penetration, but rather are clipped or attached to free structure. These configurations may instead of the prior description have the outer clamping member designed with a mounting foot to attach the clamp to the structure, with the inner clamping member being fastened and locked directly to the outer clamping member after rotation of the inner clamping member relative to the outer clamping member.

In most configurations the outer sleeve will be of greater diameter than the primary fuel line inside it, so spacers may be needed for the clamping positions. If an effective insulation volume is desired or to avoid the sleeve sagging and influencing spacing margins between the protected line assembly and other features of the vehicle, then intermediate spacers can also be used in-between the clamping positions.

Thus, the sealed volume may comprise one or more spacers arranged to maintain a separation between the primary fuel conduit and the outer sleeve.

In some embodiments at least one of the one or more spacers provides a sealed barrier to divide the sealed volume into first and second adjacent sealed sub-volumes of the sealed volume.

Alternatively, or in addition, at least one of the one or more spacers may be configured to permit fluid to flow across it. spacers, optionally with openings to permit fluid flow.

Intermediate spacers should be lightweight for weight sensitive applications and, in some embodiments, should allow the flow of gas or liquid through them. This can be achieved by the spacer having sufficient holes placed in the direction of the flow, although a sufficient gap from the outer diameter of the spacer and the inner diameter of the sleeve may suffice. These intermediate spacers will in most cases have an inherent clamping load or interference fit to fix their position on the primary fuel line. The intermediate spacer may be single piece and installed on individual primary fuel line pipes before they are assembled, or single piece designed with a split so they can be installed later, or even in multiple parts that are assembled over the primary fuel line after assembly.

In a clamping position, the spacer can be of different configurations depending on the purpose. The spacer should be of sufficient strength that it does not detrimentally crush when a clamp is installed and clamped over the outer sleeve. The inner surface of a clamp spacer may as for the intermediate clamps be an interference fit to restrain the primary line from transitional movement. Alternatively, if translational movement of the primary line is desirable, for instance to avoid stresses being introduced to the primary fuel line such as from thermal expansion or contraction, then the internal surface of the spacer can be of clearance fit to allow such translational movement.

If the sealed volume defined between the primary fuel line and the outer sleeve is to be filled with (an inert) gas to promote safety and insulation properties, then the clamp spacers will have sufficient holes in them to allow the introduced gas to flow along the full length of the installed sleeve. Where a gas is not injected into this sealed volume, a configuration with clamping spacers that completely fill the space between the primary fuel line and the outer sleeve and do not allow flow between one clamping position and another is also a possible configuration to create subdivisions of the sealed volume. The selection of such a variation of the innovation gives the possibility in the case of a failure of the primary fuel line to allow the identification of the zone where failure has occurred as only the section between the filled clamps will be filled and trigger any sensors.

In some embodiments the outer sleeve may extend the full length of the primary fuel line, whereas other embodiments it may be necessary or beneficial for the installation and future maintenance to break the outer sleeve into several segments. For both types of embodiments each end of an outer sleeve segment will need to be connected to a fitting to create the sealed volume between the primary fuel line and the outer sleeve. This end fitting may be a durable fitting installed into the primary line, but with a second surface or male thread to match the outer sleeve. The outer sleeve may terminate in a matching female threaded union, or alternatively may mate with a close-fitting flat surface with a sealant interface and external clamps to connect the outer sleeve to the fitting. Some fittings, for embodiments that use an inert gas or pressure in the sealed volume between the primary fuel line and the outer sleeve, the end fitting can have a tapping to introduce the gas into the volume. This tapping can be used in periodic maintenance to assess the effective sealing of the sealed volume. Other end fittings may have a fused burst valve connected to the sealed volume that triggers at a defined limit pressure, with a connection that allows any leakage to be safely ejected from the vehicle.

Thus, the protected fuel line may comprise an end fitting for connecting the primary fuel conduit and the outer sleeve to a fuel system component, the end fitting comprising a bore to provide fluid communication between the primary fuel conduit and the fuel system component, a generally ring-shaped interface surface arranged to receive an open end of the outer sleeve to provide a sealed mating connection therebetween, and a web extending between the bore and the interface surface to enclose the sealed volume.

In some embodiments the interface surface may comprise a male thread to cooperate with a female thread at the open end of the outer sleeve.

The end fitting may include a valve operable to provide fluid communication with the sealed volume.

A second aspect of the invention provides a method of assembling a protected fuel line according the first aspect, the method including: (a) installing the primary fuel conduit within a vehicle structure, the primary fuel line having a first end and a second end; (b) installing the outer sleeve by sliding it over the primary fuel conduit from the first end to the second end; and (c) sealing the outer sleeve to the primary fuel conduit at the first and second ends to define the sealed volume.

The method may include the further step of, after step (a) and before step (b), installing one or more spacers on the primary fuel conduit. The spacers may be configured as defined above in relation to the first aspect.

Alternatively, or in addition, the method may include the further step of installing one or more clamps to secure the outer sleeve to the vehicle structure.

In embodiments in which the one or more clamps comprise a clamp as defined above in relation to the first aspect of the invention, the method may include: installing the inner clamping member such that its inner bearing surface bears against the outer sleeve; installing the outer clamping member such that its outer bearing surface bears against an opening of the vehicle structure through which the outer sleeve passes; and providing relative movement of the inner and outer clamping members to cause relative movement of the ramped mating surfaces to urge the inner bearing surface away from the outer surface to thereby apply a clamping force to the outer sleeve.

A third aspect of the invention provides a protected fuel line comprising a primary fuel conduit and an outer sleeve encircling the primary fuel conduit to define a sealed volume therebetween, the outer sleeve comprising a frangible portion configured to burst when a pressure within the sealed volume exceeds a threshold pressure, and optionally wherein the frangible portion is in fluid communication with a venting conduit arranged to deliver fuel from the frangible portion to a safe location.

Other aspects of the invention are set out below.

A fuel line that is protected from fuel escape due to failure of the primary fuel line by a secondary flexible outer sleeve that is made from a selectively permeable or impermeable membrane. The primary fuel line can include simple rigid pipes, bellows, unions, swage fittings, semi-rigid and flexible elements. The secondary outer sleeve can protect one or more elements of the primary fuel line.

A fuel line protected by a flexible outer sleeve that is reinforced by a weave or coils made of a strong material such as metal, CFRP or glass. The weave or coils may or may not be continuous. A single coil or multiple coils may be used.

A protective secondary outer sleeve with a non-conductive reinforcing weave or coil that introduces a bonding capability into the sleeve by the inclusion of metallic wires or straps into the weave or coil.

A fuel line that is protected and insulated by a sealed volume defined by a primary fuel line and a secondary outer sleeve which may also be filled with an inert gas.

A fuel line that is protected by a secondary outer sleeve which if a leakage failure of the primary fuel line occurs and introduces an over-pressure will break a fused burst valve and allow the venting of the leaking fuel safely away from the vehicle.

A fuel line that is protected by a secondary outer sleeve which if a leakage failure of the primary fuel line occurs and introduces an over-pressure will break a fused burst valve which will be monitored to detect the failure.

A fuel line that is protected by a secondary outer sleeve which if a leakage failure of the primary fuel line introduces an over-pressure it will be detected by a direct pressure sensor.

A fuel line that is protected by a secondary outer sleeve which if a leakage failure of the primary fuel line introduces an over-pressure it will cause the outer sleeve to expand causing breakage of a monitored frangible wire to detect the failure.

A system of spacers that enable a flexible secondary outer sleeve for a fuel line to be optimally located in relation to the primary fuel line. The spacers may alternatively allow fluid to flow the full length of the sealed volume enclosed between the primary fuel line and secondary outer sleeve, or the spacers may divide the sealed volume into sub-volumes to isolate a failure.

A spacer for clamping positions for a fuel pipe and sleeve arrangement that positionally locates the primary pipe but has a clearance to allow longitudinal translation of the primary pipe, whilst also supporting the fitting of an external clamp of the assembly.

A clamp system of two or more parts, that can be assembled over a pipe assembly to locate and clamp a pipe and sleeve arrangement, or other types of pipe assemblies or conduits, with the use of a eccentric surface that when one half of the clamp is rotated in relation to the other half will create a clamping pressure for the pipe assembly or conduit.

A clamp of two parts or more using an eccentric surface and rotation to create a clamping force on a circular or near circular system line or conduit that has features to align and secure the clamp into a vehicles structural penetration, or to be fastened to a free surface.

Throughout the description and claims of this specification, the words "comprise" and "contain" and variations of the words, for example "comprising" and "comprises", mean "including but not limited to", and do not exclude other components, integers or steps. Moreover, the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

In general terms, the invention provides a protected fuel line 100 for dispensing fuel. For example, cryogenic fluid in the form of liquid hydrogen, or a mixture of liquid and gaseous hydrogen, or gaseous hydrogen at cryogenic or non-cryogenic temperatures. In the illustrated embodiments the protected fuel line 100 is for mounting in an aircraft to supply fuel (in the form of gaseous hydrogen) to an aircraft propulsion system or to discharge over-pressure fuel from a storage tank via a safety vent line. However, in other embodiments the protected fuel line 100 according to the invention may be applied to marine, land or space vehicles. Moreover, the fuel line 100 may have utility in any application where weight, complex installation conditions and safety are important design factors.

Figure 1:
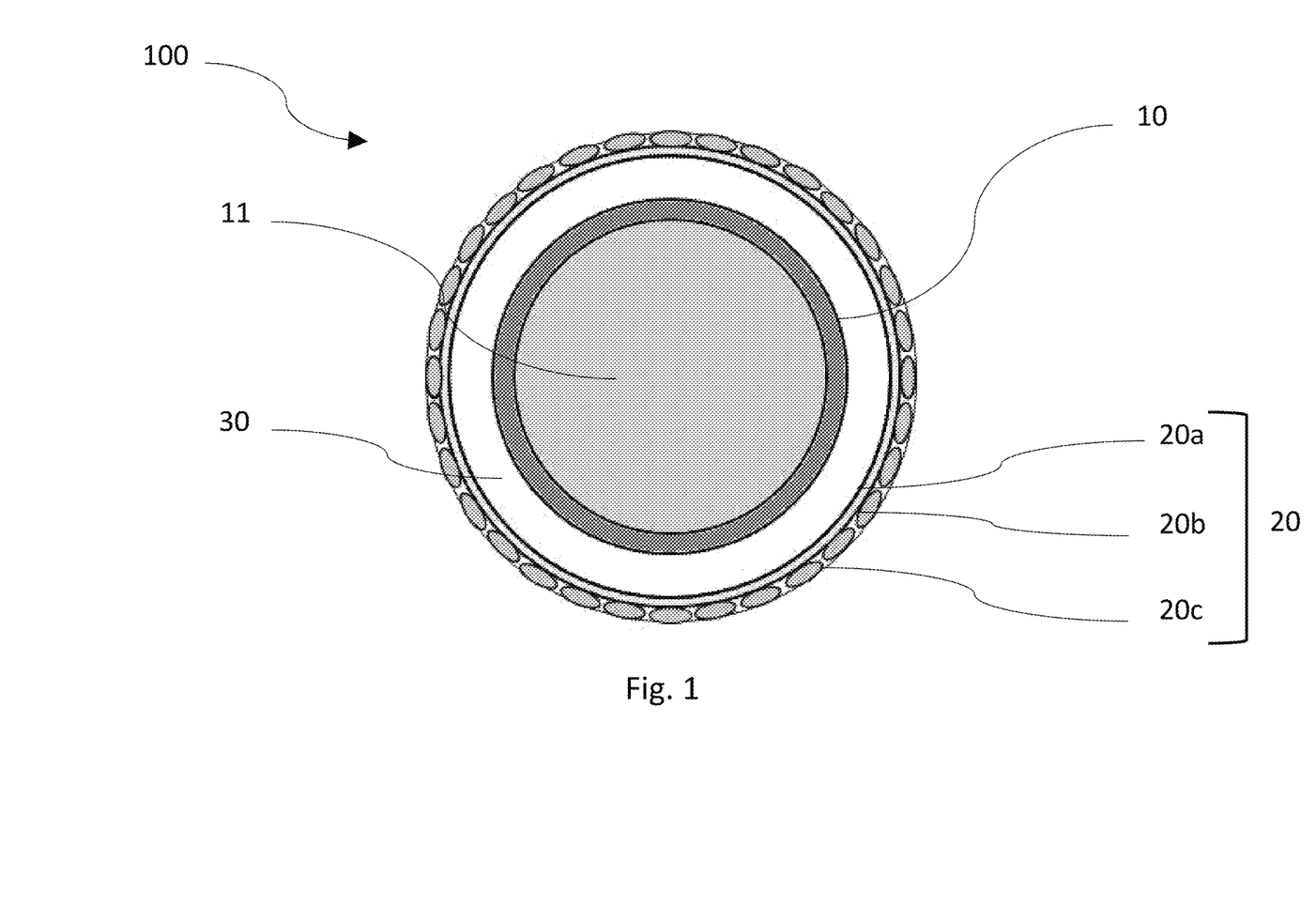
FIG. 1 illustrates a sectional view of the primary line and outer sleeve according to an embodiment of the invention.

The fuel line 100 is illustrated schematically in FIG. 1, which shows a primary fuel conduit 10 through which in normal operation gaseous or liquid fuel may flow 11, surrounding this is a flexible outer sleeve 20 which defines a sealed volume 30 therebetween. The primary fuel conduit 10 may be an individual pipe, or an assembly of pipes and elements such as bellows joined by an appropriate means, including swaging or mechanical connections like threaded unions or bolted flanges. The outer sleeve is made from a selectively permeable or impermeable membrane 20a for the fuel type used in the system and a reinforcing weave or coil 20b made from a suitably strong material such as steel wire or carbon fibres to resist the failure pressures should the primary fuel conduit 10 leak or break. In some embodiments there may be an additional layer of material 20c to provide abrasion resistance or additional thermal insulation. For embodiments where the failure pressures are not high, or there is another restraining feature, then the reinforcing weave or coil 20b may be unnecessary and optionally excluded. The minimum internal diameter of the outer sleeve 20 will be determined by the maximum diameter of any elements of the assembled primary fuel conduit 10, and optionally for cryogenic applications any insulation needs.

The sealed volume 30 may be optionally excluded in some applications, such as for a primary fuel conduit 10 that is a single formed pipe, but typically will be present. The sealed volume 30 where it is present, may be filled with air at the ambient pressure when the protected pipe assembly is completed, or may alternatively be filled with a pressurised gas, which may also be an inert gas to increase safety. The pressure delta between the sealed volume 30 and the external air pressure shall not exceed the design value of any sensors, frangible trip wire 60 or frangible burst vent 73 connected to the sealed volume 30 and the pressure delta shall take into account changes in surrounding ambient air pressure due to normal vehicle operation, such as a change in altitude.

Figure 2:
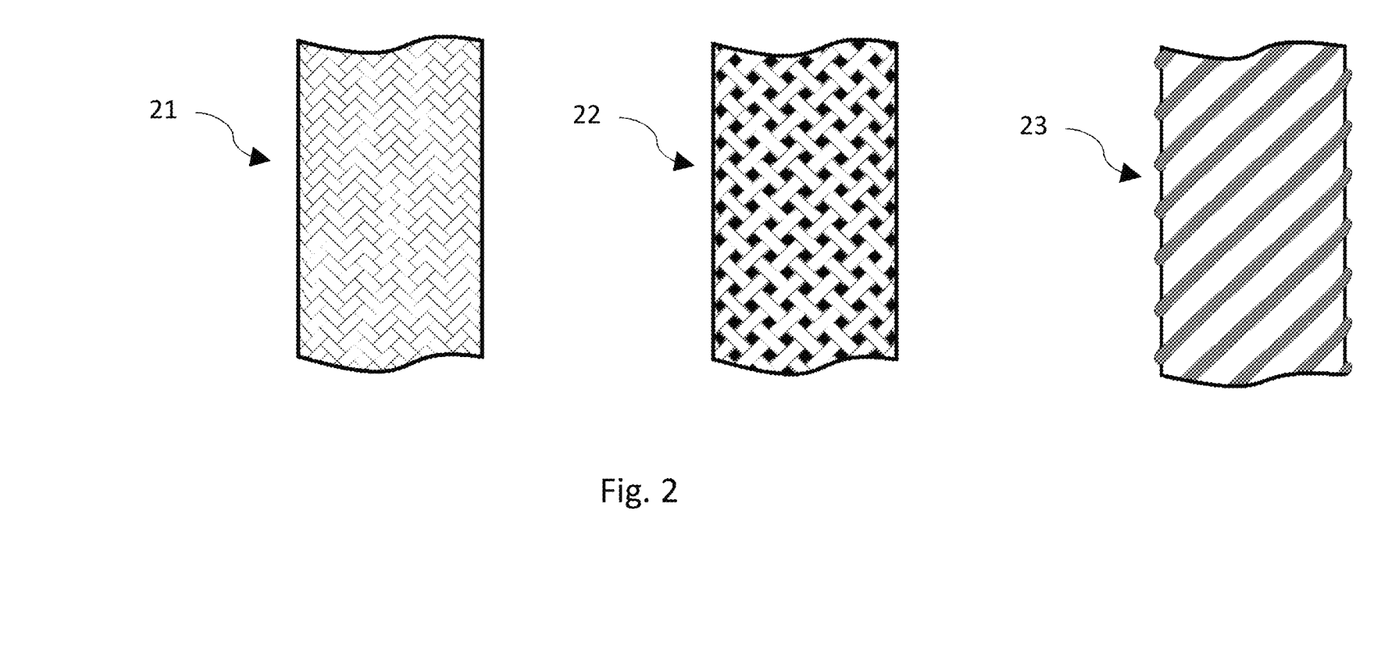
FIG. 2 illustrates different types of reinforcing weaves or coils that might be used to reinforce the outer sleeve.

The reinforcing weave or coil 20b embodiment for the outer sleeve 20 may be of any appropriate weave or coil tailored to react the failure pressures of the application, whilst ensuring sufficient flexibility and low weight for weight sensitive application embodiments. Alternative embodiments may replace the reinforcing weave or coil 20b with a monolithic material. Preferred embodiments shown in FIG. 2 may include a tight weave 21 for very high failure pressure applications, a loose weave 22 for medium failure pressure applications, or a coil 23 for low failure pressure applications. Any weave type, for instance twill 21 or plain 22, or coil type, such as a single helix 23 may be used. The materials for the reinforcing weave or coil 20b in preferred embodiments may be monolithic metallic wire, or bundles of fibres such as carbon fibre. If the embodiment does not use a conductive material for the reinforcing weave or coil 20b, then a supplementary conductive element, such as a copper wire may be woven into the embodiment to enable bonding of the outer sleeve 20.

FIGS. 3a to 3h show a sequential series of sectioned views illustrating assembly of a preferred embodiment of a protected fuel line within a vehicle structure 200. This begins in FIG. 3a with the structure elements of the vehicle 201 of which one or more elements make it impossible to install a rigid or semi-rigid fuel conduit in a single piece. There may be other reasons that installation of a single fuel pipe is not possible, such as manufacturing constraints, or the presence of other systems or equipment that similarly make the placement of a single piece conduit impractical and these conditions would be applicable for the embodiment of the invention. The structural elements 201 will have penetrations 202 designed into them to allow the later installation of the fuel line.

Figure 3A:
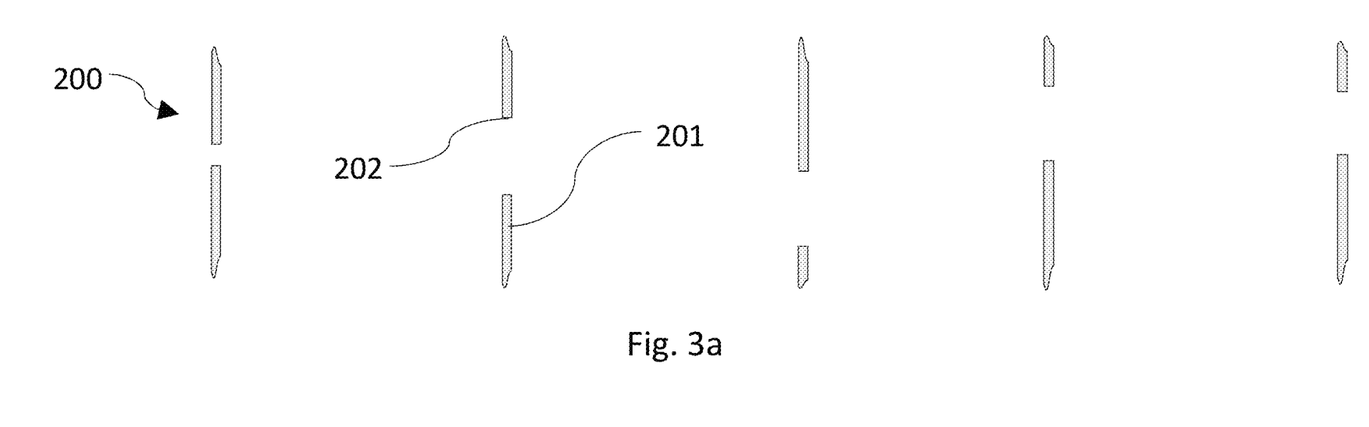
FIGS. 3a-h illustrates an example assembly and installation of the protected fuel line according to an embodiment of the invention.
Figure 3B:
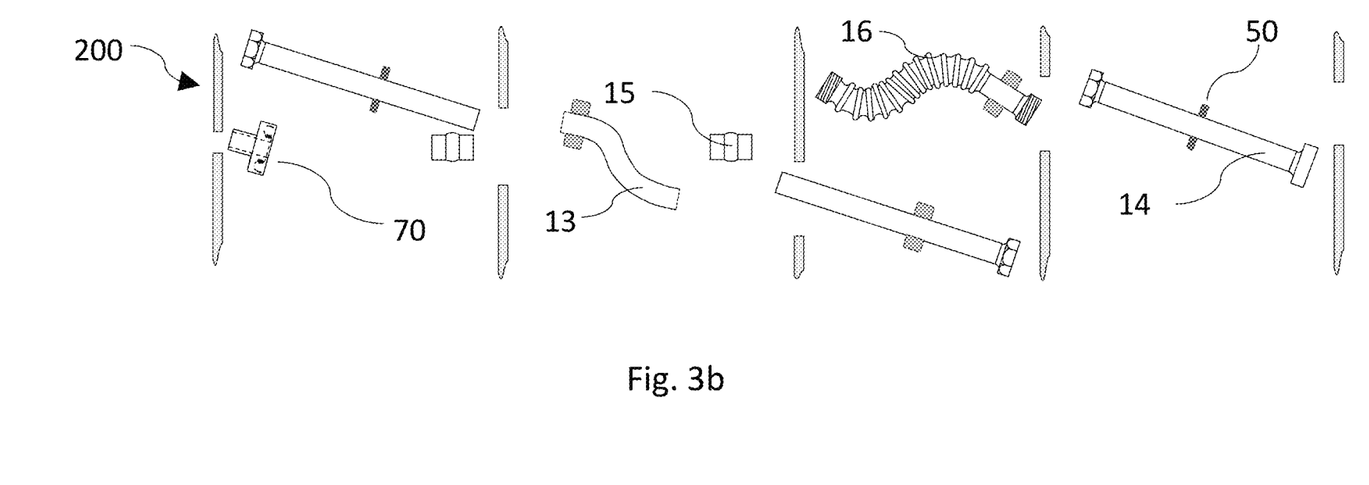

Next in FIG. 3b the primary fuel conduit 10 will be installed in its constituent elements into the vehicle structure 200 through the accessible spaces in the structure. The primary fuel conduit 10 can be made up of multiple constituent elements, which in preferred embodiments can include connection end fittings 70, plain tubes 13, tubes with fittings 14, swage couplings 15 and bellows 16. Some or all of the spacers 50 may be pre-installed on the constituent parts of the primary fuel conduit 10 before they are installed into the vehicle.

Figure 3C:
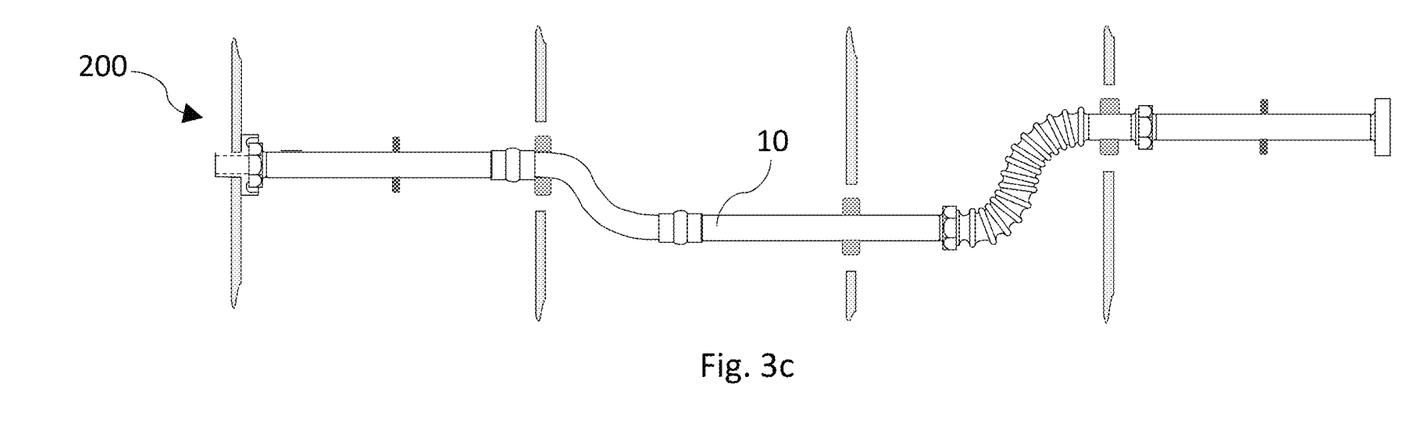

In FIG. 3c the primary fuel conduit 10 has been fully assembled whilst correctly positioned within vehicle structure 201 and with all joining operations such as swaging, tightening and locking performed and any installation tests completed.

Figure 3D:
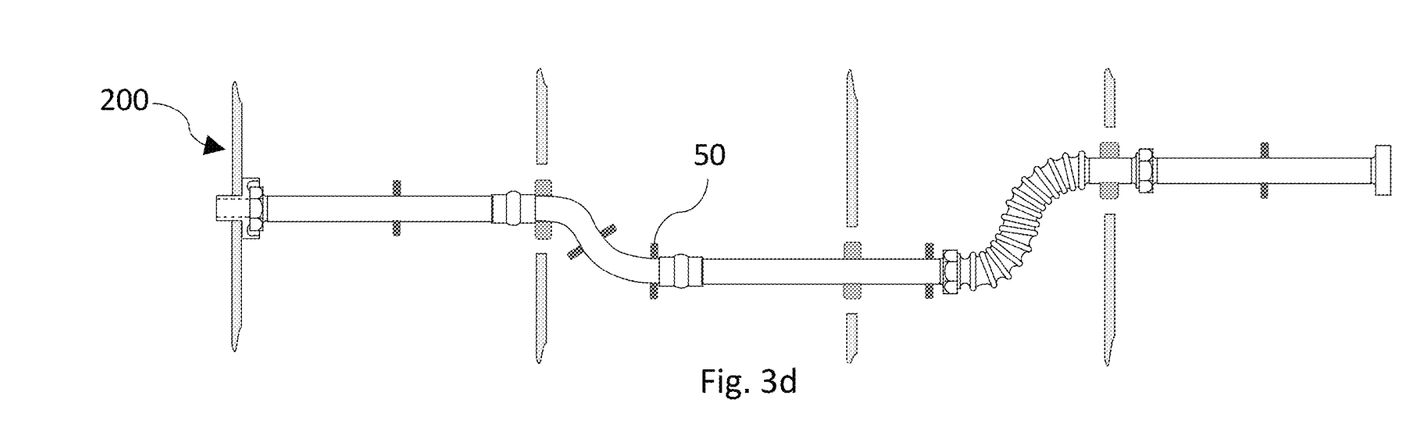

In FIG. 3d any spacers 50 which had not previously been pre-installed on the primary fuel conduit elements are installed on the primary fuel conduit 10.

Figure 3E:
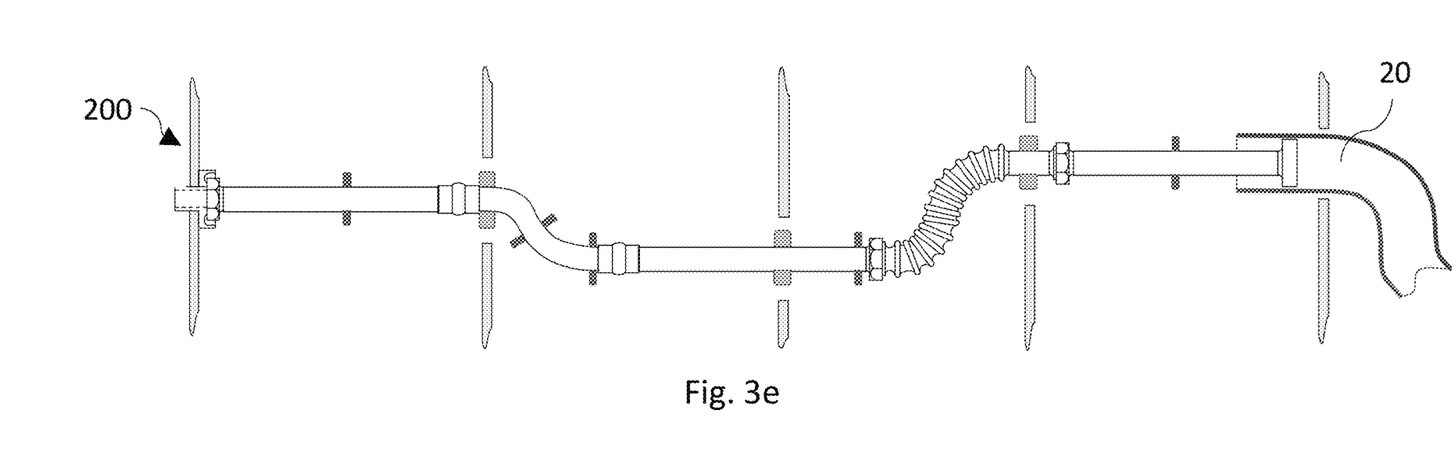

In FIG. 3e the outer sleeve 20 is drawn over the primary fuel conduit 10 and the installed spacers 50 from one or other end of the assembly.

Figure 3F:
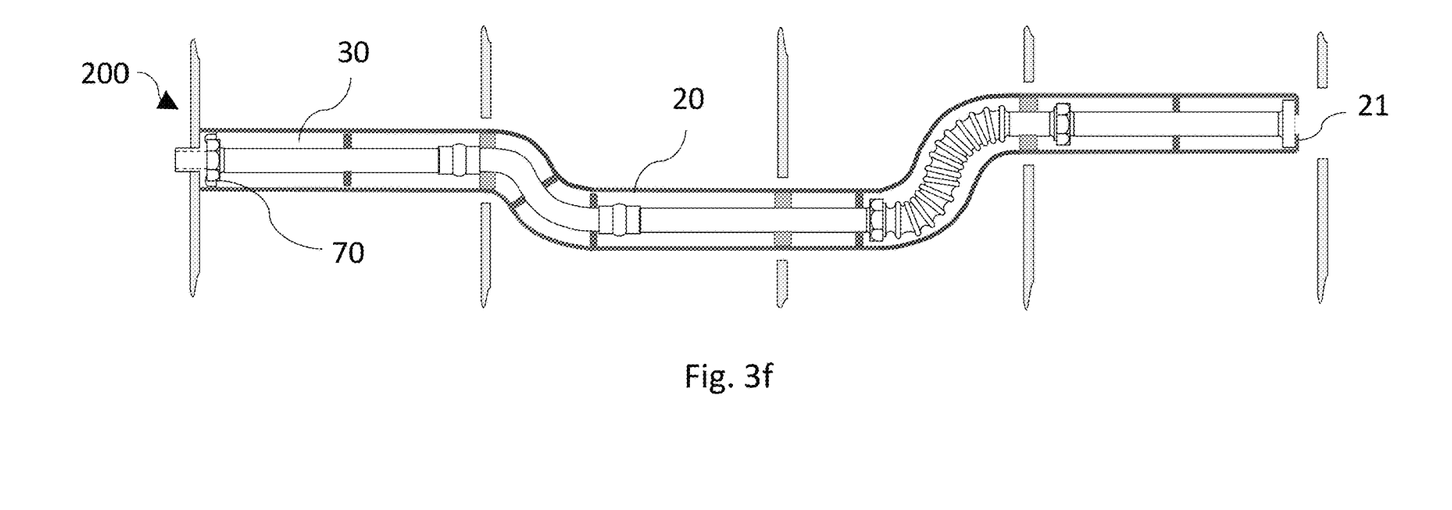

In FIG. 3f the outer sleeve 20 has been fully drawn over the primary fuel conduit 10 and is in its final installed position. In preferred embodiments this would include a mating with a matching end fitting 70 to create the sealed volume 30. In some embodiments the outer sleeve 20 may have one closed end 21 to create the closing of the sealed volume 30, but the closed end 21 will have an opening for the fuel 11 to flow and to clear any specific features on the adjacent primary fuel conduit 10 fitting. In other embodiments both ends of the outer sleeve 20 may be of open design to mate with an end fitting 70.

Figure 3G:
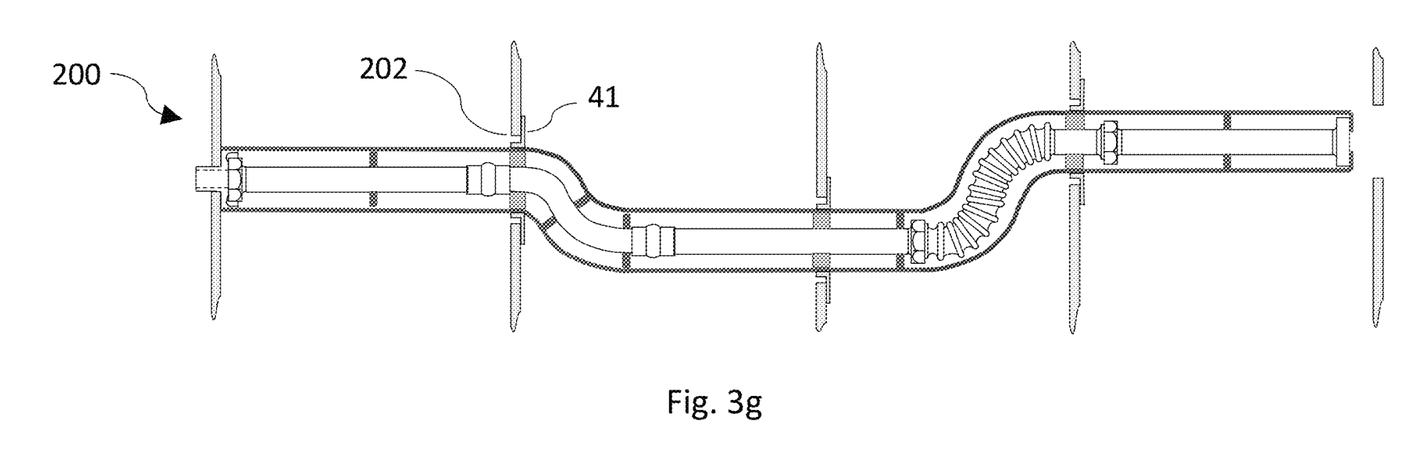

In FIG. 3g the inner element 41 of the clamps 40 are installed over the outer sleeve 20 and positioned inside the structural penetrations 202.

Figure 3H:
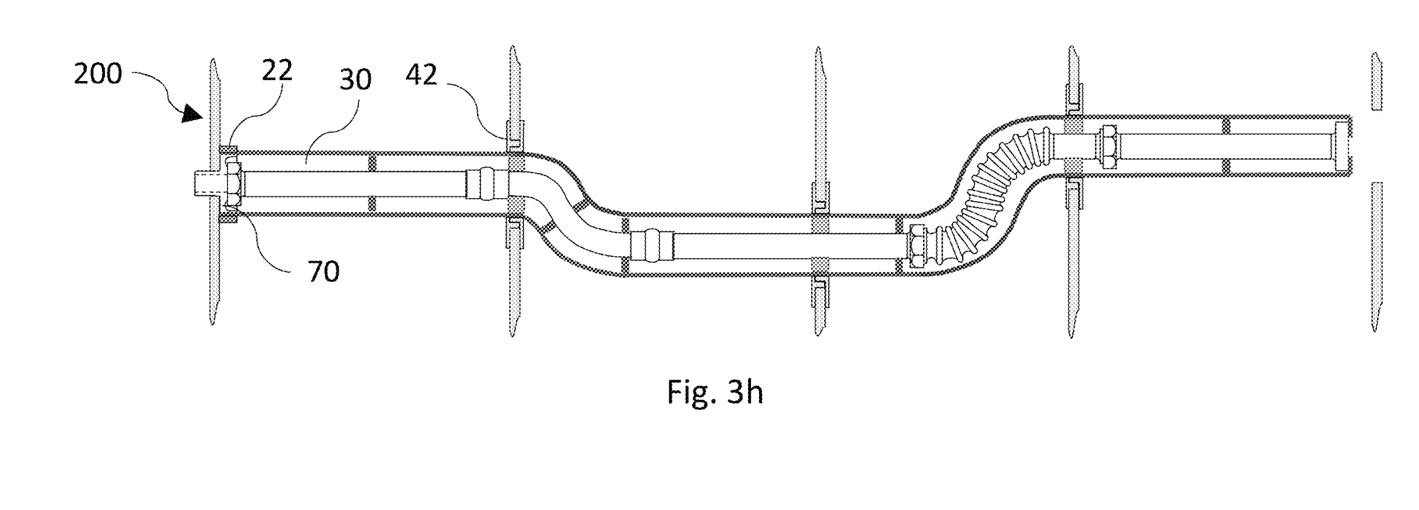

In FIG. 3h the outer element 42 of the clamps 40 are installed over the outer sleeve 20 and the slid in over the inner element 41 of the clamp 40 and inside the structural penetrations 202. The outer elements 42 are then rotated until they are positioned in their locking position and locked in place. Additionally in some embodiments with a connection end fitting 70 that does not have a threaded attachment for the outer sleeve 20, at this stage one or more of the necessary fitting sleeve clamp 22 would be installed over the outer sleeve 20 and connection fitting 70 to complete the seal of sealed volume 30.

Figure 4:
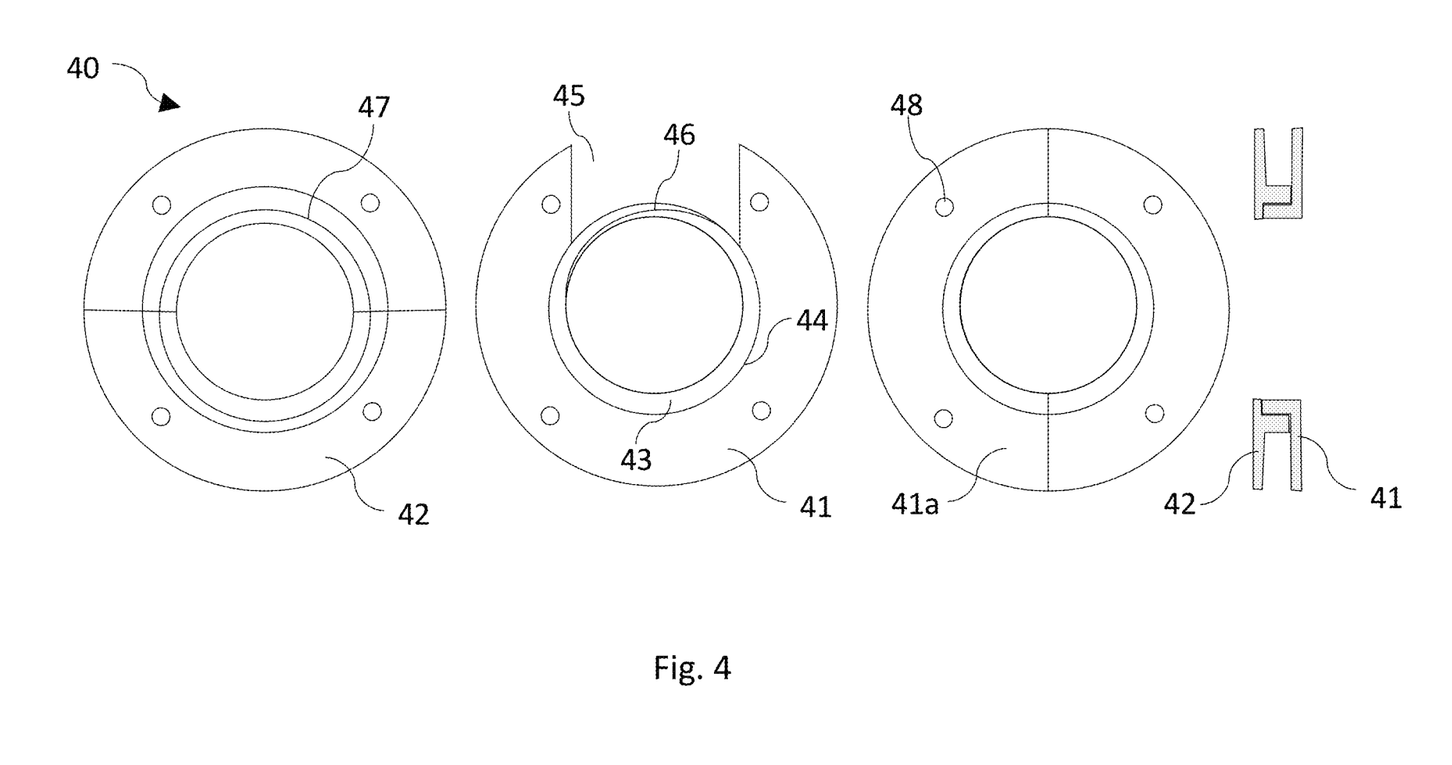
FIG. 4 illustrates some preferred embodiments of the clamp.

FIG. 4 outlines a preferred embodiment of the clamp 40. The clamp 40 consists of an inner element 41 and an outer element 42, and these elements are made out of plastic in the preferred embodiment, but various materials may be used. The inner element 41 has an inner diameter sized to match the outer sleeve 20 of the protection system. The inner bush element 43 of the inner element 41 locates inside the structural penetration 202 and has a mating surface 44 that is eccentric to the main axis of the clamp. In one embodiment of the inner element 41, the base of the clamp has a cut out 45, and the bearing surface is split 46 and possible to open up, so that the whole clamp can be fitted over the outer sleeve 20. An alternative embodiment of the inner element 41a consists of two or more separate elements that can be connected by a snap fitting or mechanical fasteners over the outer sleeve 20. The outer element 42 may in some embodiments be single piece with a cut-out similar to the depiction of the inner element 41, but in the preferred embodiment the outer element 42 will be two or more separate elements that can be connected by a snap fitting or mechanical fasteners over the outer sleeve 20. The mating surface 47 of the outer element 42 that mates to the mating surface 44 of the inner element 41 will have a matched eccentric offset to the main axis of the clamp so that when the outer element 42 is rotated in relation to the inner element 41 a closing force will be induced on the inner bush element 43 of the inner element 41, creating a clamping force on the outer sleeve 20 and the assembled protected fuel line 100. Once the rotation of the outer element 42 is sufficient and complete in relation to the inner element 41, both elements will be locked in place to maintain the clamping force. In the preferred embodiment of the clamp 40 the inner element 41 and outer element 42 are shown with mounting holes 48 to allow the clamp to be mechanically fastened to the vehicle structure 201 and for both elements to be fastened together. Other embodiments may alternatively use snap fittings or other means to locate and lock the inner element 41 and outer element 42 to the vehicle structure 201.

Figure 5:
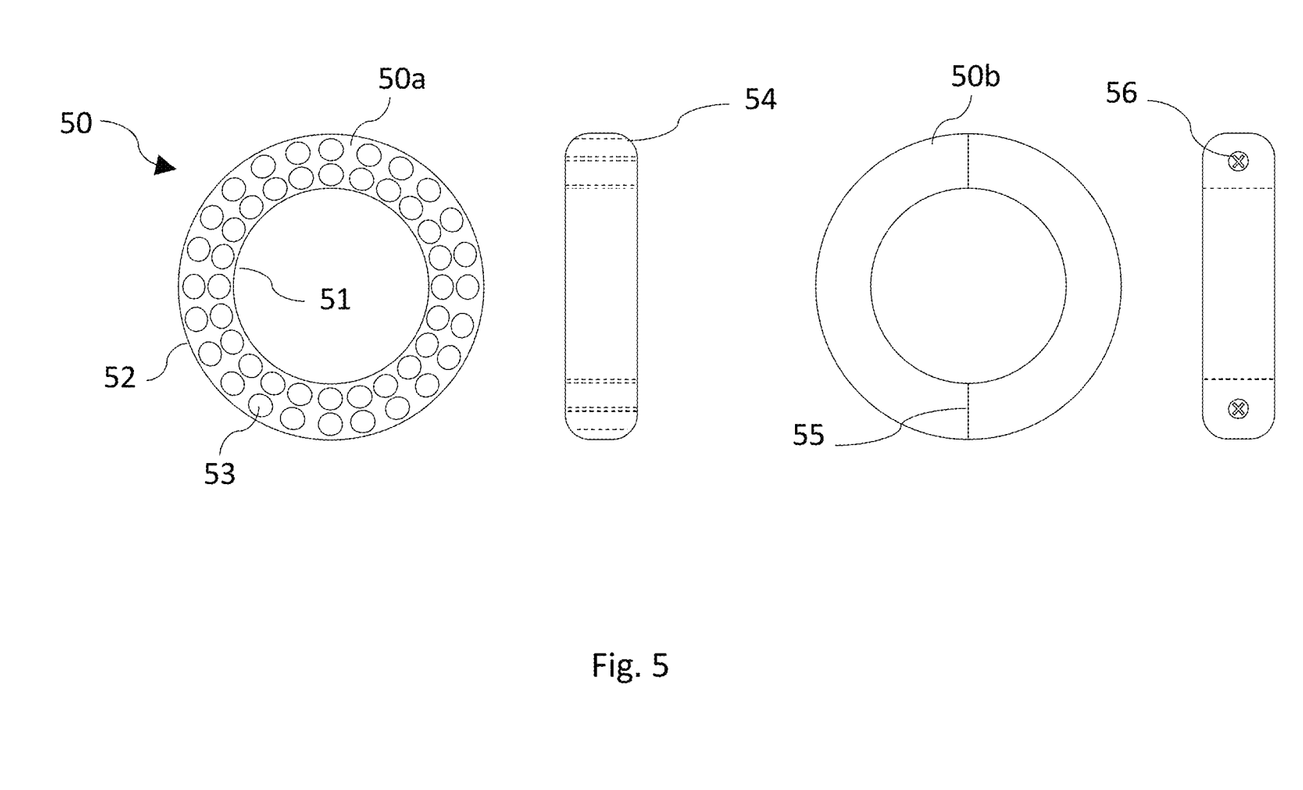
FIG. 5 illustrates some preferred embodiments embodiment of the spacer.

FIG. 5 shows two preferred embodiments of a spacer 50. The spacer 50 has an internal diameter 51 that is sized by the primary fuel conduit 10 pipe it is attached to. For intermediate spacers used solely to position the outer sleeve 20 and not used for clamping locations then the internal diameter 51 will usually be an interference fit to keep the spacer 50 in position relative to the primary fuel conduit 10. If the spacer 50 is used in conjunction with a clamp 40, then the inner diameter 51 may be a clearance fit to allow translational movement of the primary fuel conduit 10 to minimise any stresses in the primary fuel conduit 10 due to thermal loads or structural movements. Where the inner diameter 51 is clearance fit, then the spacer 50 will have one or more temporary installation attachments to stop it from moving whilst the outer sleeve is drawn over it. If, however, the spacer 50 is used in conjunction with a clamp 40 and sub-division of the sealed volume 30 is desired then the inner diameter 51 may be an interference fit to create a complete seal at the clamping position.

The outer diameter 52 of the spacer 50 is defined by the inner diameter of the outer sleeve 20. For intermediate spacers the outer diameter 52 will be a clearance to the inner diameter of the outer sleeve 20 to ease the installation of the outer sleeve over the assembled primary fuel conduit 10 and attached spacers 50. In the clamping locations, the outer diameter 52 will be a close fit or transition fit so that a good clamp can be formed between the spacer 50, the intermediate outer sleeve 20, and the clamp 40.

For locations where the spacer 50 is not used to sub-divide the sealed volume 30, then to promote the ability of leaked fuel to move within the sealed volume and/or to reduce weight then holes 53 will be introduced into the spacer 50 in preferred embodiments. These holes 53 may be circular or any other shape appropriate for weight and strength.

In preferred embodiments the outer corners 54 of the spacer 50 will be rounded to avoid the outer sleeve 20 catching on the spacer during installation or abrading on the spacer 50 in service.

The spacer 50 may be formed from a single element 50a, where the spacer 50 can be installed on the plain tubes 13, tubes with fittings 14, or other elements of the primary fuel conduit 10 before it is assembled. Where the spacer 50a is made of a flexible material, some embodiments can have a radial split or cut to enable the spacer 50a to be installed on the assembled primary fuel conduit 10. Where spacers 50 of the configuration of a single element 50a cannot be fitted, then a multiple element 50b spacer with a cut 55 into two or more elements can be embodied. This multiple element 50b spacer can in some embodiments be connected by a fastener 56 or can alternatively use a snap fit between elements.

Figure 6:
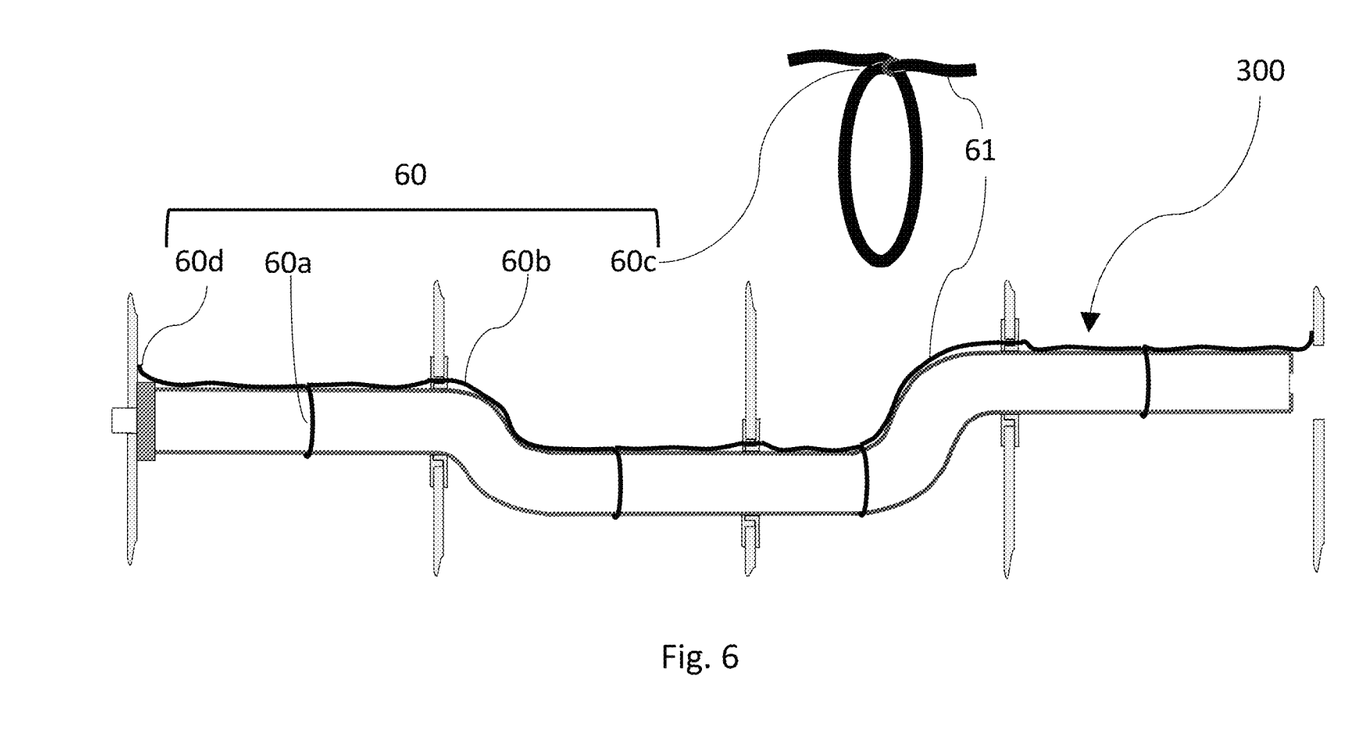
FIG. 6 illustrates a possible embodiment of the frangible trigger wire.

FIG. 6 shows and embodiment of a trip wire 60, using a frangible wire 61, to detect failures of the primary fuel conduit 10 that cause the sealed volume 30 to pressurise beyond the operational design pressure, creating an expansion of the outer sleeve 20. In preferred applications the frangible wire 61 will be metal and with the failure expansion of the outer sleeve 20 causing the loop 60a of the frangible wire 61 to snap and as the frangible wire 61 in this case is conductive this loss of conductivity can be detected if monitored. An assembled fuel conduit may have one or more loops 60a to maximise the ability to detect failure, although a single loop will usually be sufficient. For applications where it is chosen to sub-divide the sealed volume 30 with sealed spacers 50 and clamps 40, then a loop 60a will be required for each sub-divided volume. If these loops 60a are connected in parallel with an individual trip wire 60, then it will be possible to detect exactly in which sealed volume the failure has occurred. In applications where there are more than one loop 60a on an undivided sealed volume 30 then these will be interconnected by an extension of the wire 60b with all loops 60a and the connecting wires 60b being a single continuous piece of wire. To form the loops 60a a crimp 60c is used to stop the wire pulling through and expanding the loop 60a rather than failing due to the over pressure of the sealed volume. The frangible wire 61 in preferred embodiments will have its outside protected to avoid conduction through the crimp 60c point and to also protect the wire from abrasion. The trip wire 60 at its termination 60d may either be connected in series with the trip wire of adjacent assemblies, but giving less fidelity in failure identification, or via an independent connection to the failure sensor. In preferable embodiments each individual sealed volume 30 or sub-division of the sealed volume will have an independent trip wire 60 to enable easy maintenance trouble shooting. The frangible wire 61 in preferred applications is conductive metal but may be replaced with another media where a break from the outer sleeve 20 expanding will result in failure detection, such as a fibre optic wire. An alternate sensing solution to a trip wire 60 would be the direct placement of pressure sensors within the sealed volume during assembly, or monitoring of a fused burst vent 73 if fitted.

Figure 7:
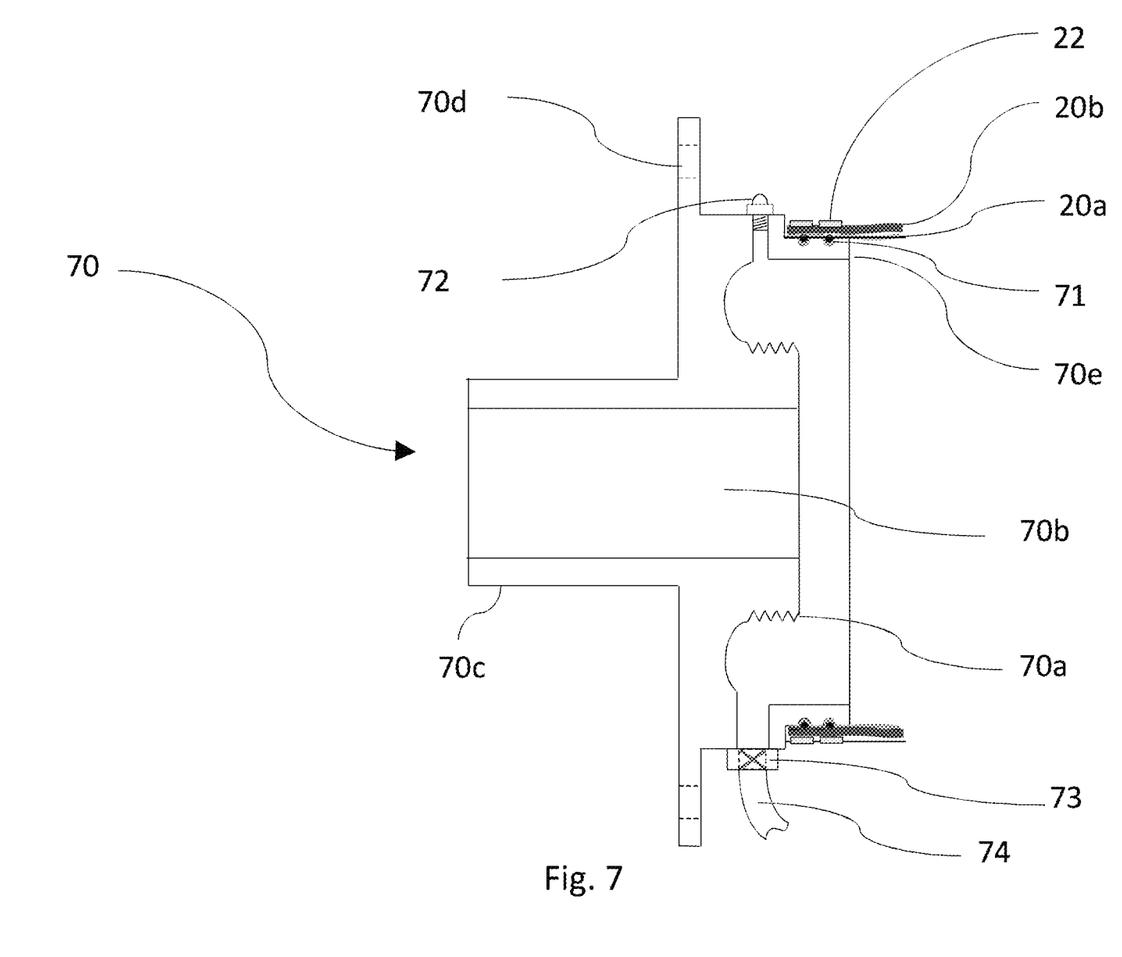
FIG. 7 illustrates an embodiment of the end fitting to seal the volume between the outer sleeve and primary fuel line.

FIG. 7 shows a preferred embodiment of an end fitting 70 to connect the primary fuel conduit 10 and the outer sleeve 20 to create the sealed volume 30. This end fitting 70 in preferred embodiments can have a threaded connection 70a to attach the primary fuel conduit 10, which is not shown in the figure. The end fitting 70 has a bore 70b through it to connect the primary fuel conduit 10 to an attached equipment, storage vessel or another fuel line, with an interface space 70c for an appropriate attachment, such as a thread, to make the connection. The end fitting 70 will also have features such as fastener holes 70d in preferred embodiments to attach the fitting to a mounting structure or to attach it to equipment.

The end fitting 70 also has an interface surface 70e to attach the outer sleeve 20. This interface surface may in some embodiments include matching surfaces to enable additional clamping features such as rings 71 that are seated within respective annular grooves to securely clamp the selectively permeable or impermeable membrane 20a and seal it to the end fitting 70 to avoid leakage from the sealed volume 30. Sealant to enhance the seal between the interface surface 70e and selectively permeable or impermeable membrane 20a may be additionally used in some embodiments. Over the top of the selectively permeable or impermeable membrane 20a is the reinforcing weave or coil 20b, which will be additionally clamped to the fitting by one or more fitting sleeve clamps 22. Alternate embodiments of the invention may replace the interface surface 70e with a male thread and integrate a matching female threaded fitting onto the end of the outer sleeve 20 to create the attachment between the end fitting 70 and the outer sleeve 20.

If pressurised or inerting gas is used in the sealed volume 30, then in preferred embodiments one of the end fittings 70 for an assembled protected fuel line will have a connection and valve 72 to allow the introduction of the gas. Alternatively, a valve fitting may be inserted into the outer sleeve 20, but with more difficulty. This valve 72 can be used during period maintenance to confirm the contained pressure within the sealed volume and that there are no leaks from the outer sleeve 20 and end fittings 70.

In some applications of the invention the end fitting may optionally include a venting connection with a fused burst vent 73 that selectively fails above a set pressure delta for the sealed volume 30 versus the external air pressure. This fused burst vent 73 is attached to a vent line 74 that directs the leaking fuel safely away from the vehicle. The activation of the fused burst vent 73 if connected to a sensor is another means the invention can use to detect a failure of the primary fuel conduit 10.

What is claimed is:

1. A protected fuel line, comprising:
    a primary fuel conduit; and
    an outer sleeve encircling the primary fuel conduit to define a sealed volume between the primary fuel conduit and the outer sleeve,
    wherein the outer sleeve comprises a frangible portion configured to burst when a pressure within the sealed volume exceeds a threshold pressure causing the outer sleeve to expand to or beyond a given threshold, wherein the frangible portion comprises a burst vent and/or a trip wire, and
    wherein the frangible portion is in fluid communication with a venting conduit arranged to deliver fuel from the frangible portion to a safe location.

2. A protected fuel line within a vehicle, the fuel line comprising:
    a primary fuel conduit installed into a vehicle structure for delivery of a fuel from a storage tank to a propulsion system, the primary fuel conduit having a first end and a second end and comprising a plurality of interconnected rigid or semi-rigid fuel pipes and connecting elements therebetween extending through a plurality of penetrations in the vehicle structure between the first end and second end; and
    an outer sleeve comprising a flexible membrane which is impermeable to the fuel, the flexible membrane extending continuously from the first end to the second end, encircling the primary fuel conduit and sealed to the first end and second end of the primary fuel conduit to define a sealed volume between the primary fuel conduit and the outer sleeve,
    such that the fuel line is protected from fuel escape due to failure of the primary fuel conduit by the sealed volume being configured to restrain fuel leaking from the primary fuel conduit.

3. The protected fuel line according to claim 2,
    wherein the first end is at the storage tank,
    wherein the second end is at the propulsion system,
    wherein the sealed volume between the primary fuel conduit and the outer sleeve extends from the first end to the second end.

4. The protected fuel line according to claim 2, wherein the connecting elements include threaded unions or bolted flanges.

5. The protected fuel line according to claim 2, wherein the outer sleeve comprises one or more reinforcement members, the reinforcement members comprising woven or coiled reinforcement elements encircling the flexible membrane.

6. The protected fuel line according to claim 2, wherein the sealed volume comprises an insulating gas at a pressure above an environmental pressure.

7. The protected fuel line according to claim 6, wherein the insulating gas is an inert gas.

8. The protected fuel line according to claim 2, wherein the outer sleeve comprises a frangible portion configured to burst when a pressure within the sealed volume exceeds a threshold pressure, and wherein the frangible portion is in fluid communication with a venting conduit arranged to deliver fuel away from the frangible portion.

9. The protected fuel line according to claim 2, comprising a failure detection system including a pressure sensor configured to detect changes in pressure in the sealed volume.

10. The protected fuel line according to claim 2, comprising a failure detection system including a frangible wire encircling the outer sleeve, the frangible wire being configured to break if the outer sleeve expands to or beyond a given threshold, and a detection system for detecting a break of the frangible wire.

11. The protected fuel line according to claim 2, wherein the sealed volume comprises one or more spacers arranged to maintain a separation between the primary fuel conduit and the outer sleeve.

12. The protected fuel line according to claim 11, wherein at least one of the one or more spacers provides a sealed barrier to divide the sealed volume into first and second adjacent sealed sub-volumes of the sealed volume.

13. The protected fuel line according to claim 11, wherein at least one of the one or more spacers is configured to permit fluid to flow across it.

14. The protected fuel line according to claim 2, comprising a clamp for securing the outer sleeve to a structural member, the clamp comprising an inner clamping member and an outer clamping member, the inner clamping member having an inner bearing surface adjacent the outer sleeve, the outer clamping member having an outer bearing surface configured to be installed adjacent a surface of the structural member, and the inner and outer clamping members each comprising one of a pair of cooperating ramped mating surfaces, wherein relative movement of the ramped mating surfaces urges the inner bearing surface away from the outer bearing surface to thereby apply a clamping force to the outer sleeve.

15. The protected fuel line according to claim 14, wherein the pair of cooperating ramped mating surfaces each comprise an eccentric mating surface defined by a curved plane with a radial axis that is offset from an axis of the primary fuel conduit or the outer sleeve.

16. A vehicle, comprising
a propulsion system,
a vehicle structure, and
a protected fuel line extending through the vehicle structure for delivery of a fuel to the propulsion system, wherein the protected fuel line comprises:
a primary fuel conduit, through which in normal operation gaseous or liquid fuel may flow, installed into the vehicle structure, the primary fuel conduit having a first end and a second end and comprising a plurality of interconnected rigid or semi-rigid fuel pipes and connecting elements therebetween; and
an outer sleeve comprising a flexible membrane which is impermeable to the fuel, the flexible membrane encircling the primary fuel conduit and sealed to the first end and second end of the primary fuel conduit to define a sealed volume between the primary fuel conduit and the outer sleeve,
such that the fuel line is protected from fuel escape due to failure of the primary fuel conduit by the sealed volume being configured to restrain fuel leaking from the primary fuel conduit; and
a clamp for securing the outer sleeve to a structural member of the vehicle structure, the clamp comprising
an inner clamping member and
an outer clamping member,
the inner clamping member having an inner bearing surface adjacent the outer sleeve,
the outer clamping member having an outer bearing surface configured to be installed adjacent a surface of the structural member, and
the inner and outer clamping members each comprising one of a pair of cooperating ramped mating surfaces,
wherein relative movement of the ramped mating surfaces urges the inner bearing surface away from the outer bearing surface to thereby apply a clamping force to the outer sleeve.

17. The vehicle according to claim 16, wherein the pair of cooperating ramped mating surfaces each comprise an eccentric mating surface defined by a curved plane with a radial axis that is offset from an axis of the primary fuel conduit or outer sleeve.

18. The vehicle according to claim 16, wherein the protected fuel line further comprises a failure detection system including a pressure sensor configured to detect changes in pressure in the sealed volume.

19. The vehicle according to claim 16, wherein the fuel is a cryogenic fuel.

20. A method of assembling a protected fuel line, comprising:
installing a primary fuel conduit within a vehicle structure, the primary fuel line having a first end and a second end and comprising a plurality of interconnected rigid or semi-rigid fuel pipes and connecting elements therebetween extending through a plurality of penetrations in the vehicle structure between the first end and second end;
providing an outer sleeve comprising a flexible membrane which is impermeable to fuel;
installing the outer sleeve by sliding the outer sleeve over the primary fuel conduit from the first end to the second end such that the flexible membrane encircles the primary fuel conduit;
sealing the outer sleeve to the primary fuel conduit at the first and second ends to define a sealed volume between the primary fuel conduit and the outer sleeve; and
restraining fuel leaking from the primary fuel conduit in the sealed volume.

21. The method according to claim 20, further comprising:
installing one or more spacers on the primary fuel conduit before installing the outer sleeve.

22. The method according to claim 20, further comprising:
installing one or more clamps to secure the outer sleeve to the vehicle structure.

* * * * *